Oct. 16, 1962 P. B. FONDÉN ET AL 3,058,703
STORING MECHANISM FOR AIRPLANE ARRESTING NETS
Filed Jan. 21, 1960 2 Sheets-Sheet 1
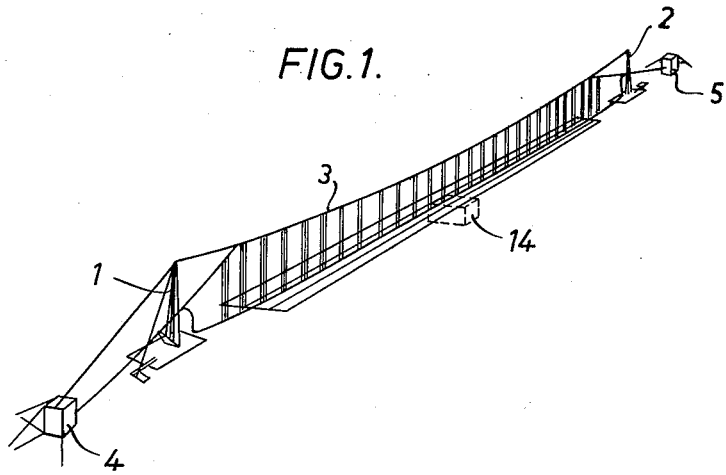
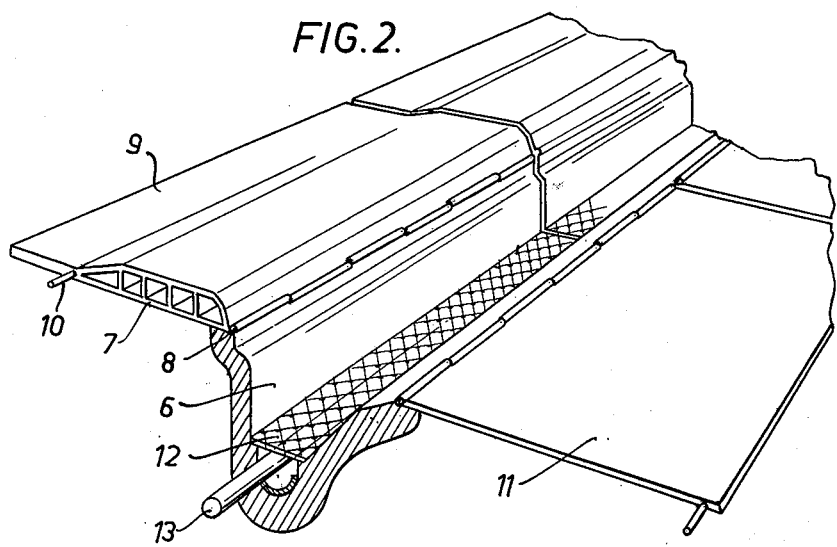
Inventors,
Per B. Fondén,
Karl O.T. Wålander
by Sommers & Young
Attorneys

# United States Patent Office 3,058,703
Patented Oct. 16, 1962

3,058,703
STORING MECHANISM FOR AIRPLANE
ARRESTING NETS
Per Börje Fondén, Gotgatan 23, and Karl Ove Torgny
Wålander, Vasavagen 49, both of Linkoping, Sweden
Filed Jan. 21, 1960, Ser. No. 3,939
3 Claims. (Cl. 244—110)

It is often necessary to dispose airplane runaway-preventing apparatus, as for instance arresting nets, in such a way as to enable airplanes, as well as other vehicles, to ride over such apparatus when in a lowered or collapsed state. If, after having been lowered or collapsed, said arresting net or the like is left lying across the runway, then there is a danger of the net hooking itself onto the undercarriage of the airplane. The net is also subject to excessively rapid wear.

The present invention has for its object to provide means for avoiding these drawbacks.

The invention is characterized, chiefly, by the provision in the ground adjacent the arresting net when in its raised or expanded position of a storage trough recessed in the ground and having angularly movable lids hinged along one or both longitudinal edges of the trough, substantially at ground level, which have for their object to gather the arresting net when lowered or collapsed and putting it into the trough.

It might be considered as an obvious matter to provide a storage trough extending across the runway for receiving the arresting net when in collapsed state, as well as to provide such a trough with covering lids for rendering the runway smooth and continuous when the lids are closed over the trough. It has proved necessary, however, to make such a trough comparatively narrow since, as a matter of fact, in the case of an actual operation the airplane must be able to run across the open trough without its nose wheel, for example, dipping thereinto which might cause leakage of the nose gear. A narrow trough, however, involves the risk that the arresting net when collapsing in windy weather does not land entirely in the trough but will, in part, be lying beside the trough, so that the lids cannot be closed and the net may get damaged, etc. The employement of field personnel to put the net manually into the storage trough before the lids are closed would be too tedious a method to be practicable, and would be unacceptable also because most modern airplane runaway-preventing or arresting appliances are fully automatic in operation.

The present invention combines the requirement for a narrow storage trough with the possibility for the arresting net, when collapsing, to land within a comparatively broad area without causing any inconvenience, in as much as the lids for covering the trough are adapted to gather and put down into the trough such portions of the net as may have landed beside the trough.

The invention is illustrated by way of example in the accompanying drawings, in which:

FIG. 1 is a perspective view of an arresting net in its raised or expanded condition;

FIG. 2 is a perspective view on an enlarged scale showing a portion of a storage trough;

Figure 3:
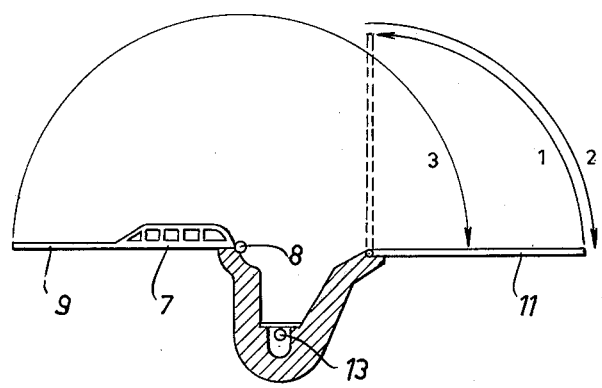
FIG. 3 is a cross-sectional view of an open storage trough.

In FIG. 1 the air-plane runway-preventing appliance shown is assumed to be disposed across a runway for airplanes. It comprises an arresting net suspended between two masts 1 and 2 capable of being raised and lowered, the net 3 being connected at its opposite ends to braking mechanisms 4 and 5, respectively, which may be assumed to be of the drum type. Placed in an excavation made in the ground across the runway and beneath the net is a trough provided with covering lids which are here shown in their open position. The bottom supporting wire of the net is disposed within said trough.

FIG. 2 is a detail view of a storage trough 6 with its lids 7 in their open position. The lids are hinged to one longitudinal edge of the trough by means of comparatively weak hinges 8. For taking up the load resulting from the weight of airplanes passing the trough special seatings are provided adjacent the two longitudinal edges of the side walls of the trough on which the lids rest when in their closed position. The lids are considerably increased in width by specific marginal extensions 9 which need not be noticeably load-supporting. The enlarged, load-supporting portion of the lid is disposed so as to face the direction of approach of an airplane to be caught by the net, and is chamfered so as to present a sort of springboard for the landing wheels of the airplane. The lids are made in sections interconnected by means of pins 10 each of which is fastened in one lid section and engages a corresponding hole in the adjacent lid section.

Hinged to the longitudinal edge of the storage trench remote from the lids 7 are comparatively wide sheet-metal guide plates 11. These plates serve a purpose corresponding to that of the marginal extensions 9 of the lids 7 already described.

Figure 4:
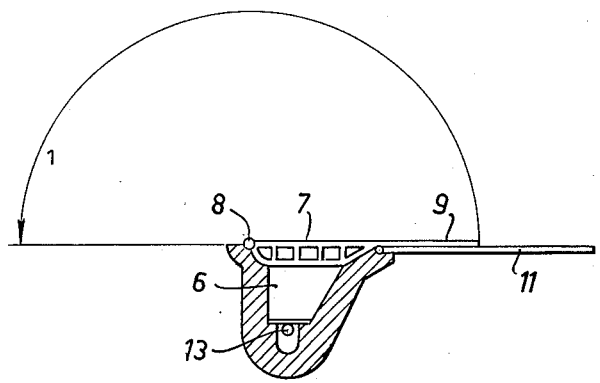
FIG. 4 is a similar view of a closed trough.

FIGS. 3 and 4 are diagrams illustrating the movements of the lids 7 and the guide plates 11 in connection with the raising and the collapsing of an arresting net. In the collapsing operation, the net is first lowered resulting in the net landing in part in the trough and in part beside the trench, though upon the lids 7 with their marginal extensions 9 as well as upon the guide plates 11. The guide plates 11 are then raised into a substantially vertical position (1st step) thus causing any parts of the net lying thereon to slide down into the trough. Then the guide plates 11 are restored to their normal position (2nd step), and subsequent to this, or simultaneously therewith, the lids 7 are closed (3rd step). When the lids with their extensions 9 reach a substantially vertical position, any portions of the net lying thereon will also slide down into the trough, so that the net as a whole will thus be stowed within the storage trough when the closing movement is completed.

Several modifications of the structure are conceivable, such as, for instance, double folding lids overlapping each other co-extensively in their closed position and adapted to be unfolded and extended by special control means in conjunction with the opening movement, etc.

As regards rain, snow and ice, the storage trench will have to be drained and kept free from frost. As shown in FIG. 2, a relatively close-meshed latticework 12 may be provided within the trench for receiving the net falling onto its upper surface. Beneath this latticework a longitudinally extending groove is formed in the trough. Provided in the uppermost portion of this groove is a heating element 13, the portion of the groove below said heating element forming a draining channel. The heating element may be associated with a thermostat preferably so adjusted as to start heating only should the temperature in the trough tend to fall below the freezing point. Since in practice relatively great demands are made upon the trough assembly as to tolerances, and especially in respect to the accuracy of the transmission of movement between the several lid sections, the trough may be provided with lids and other details manufactured in definite lengths which are assembled on the site. The lids and guide plates are suitably controlled by means of a motor unit 14, FIG. 1, buried in the middle of the runway. Their movements, of course, should be synchronized with the movements of the net-supporting masts.

We claim:
1. An appliance for storing a collapsible airplane arrest- ing net in its collapsed state, comprising side walls and a bottom wall forming a trough recessed in the ground beneath the position the arresting net will occupy in its raised operative position, a set of lids hinged to the upper edge of one longitudinal side wall of the trough to fold back therefrom for uncovering same, and a set of guide plates hinged to the upper edge of the opposite longitudinal side wall of the trough so as to be swingable from a position of rest on the ground to a substantially vertical position for guiding the portions of the collapsed net resting thereon down into the trough.

2. An appliance as claimed in claim 1 in which the trough-covering lids are formed along their edges remote from their hinged edges, with extensions adapted when the lids are moved for covering the trough, to take with them the portions of the collapsed net resting thereon and guide said portions down into the trough.

3. An appliance as claimed in claim 1, in which the lids are of a comparatively large thickness and provide an upper surface level with the ground surface when the lids are in their trough covering position, and are formed with a bottom surface raised above the ground surface when the lids are folded back onto the ground, the longitudinal edges of the lids being chamfered to suit the accordingly chamfered longitudinal side walls of the trough.

References Cited in the file of this patent

UNITED STATES PATENTS

| | | |
|---|---|---|
| 1,349,136 | Lillard | Aug. 10, 1920 |
| 2,712,912 | Hattan | July 12, 1955 |
| 2,957,657 | Frieder et al. | Oct. 25, 1960 |